(12) United States Patent
Wolf

(10) Patent No.: US 9,976,657 B2
(45) Date of Patent: May 22, 2018

(54) DOUBLE SLIP SEAL PROFILE FOR PLUG VALVES

(71) Applicant: Cameron International Corporation, Houston, TX (US)

(72) Inventor: Robert H. Wolf, Conway, AR (US)

(73) Assignee: Cameron International Corporation, Houston, TX (US)

( * ) Notice: Subject to any disclaimer, the term of this patent is extended or adjusted under 35 U.S.C. 154(b) by 0 days. days.

(21) Appl. No.: 15/089,120

(22) Filed: Apr. 1, 2016

(65) Prior Publication Data
US 2017/0284549 A1 Oct. 5, 2017

(51) Int. Cl.
*F16J 15/02* (2006.01)
*F16K 5/04* (2006.01)
*F16J 15/3232* (2016.01)
*F16K 5/02* (2006.01)
*F16K 5/06* (2006.01)

(52) U.S. Cl.
CPC .......... *F16K 5/0478* (2013.01); *F16J 15/025* (2013.01); *F16J 15/3232* (2013.01); *F16K 5/0271* (2013.01); *F16K 5/0471* (2013.01); *F16K 5/0689* (2013.01)

(58) Field of Classification Search
CPC .. F16J 15/06; F16J 15/061; F16J 15/10; F16J 15/102; F16J 15/104; F16J 15/106; F16K 5/0457; F16K 5/0471; F16K 5/0478
See application file for complete search history.

(56) References Cited

U.S. PATENT DOCUMENTS

| 3,395,889 | A | 8/1968 | Chovan | |
|---|---|---|---|---|
| 5,947,443 | A | 9/1999 | Shellenbarger | |
| 6,264,206 | B1 * | 7/2001 | Hashizawa | F16J 15/061 277/641 |
| 6,523,833 | B1 * | 2/2003 | Ishigaki | F16J 15/062 277/549 |
| 7,959,161 | B2 * | 6/2011 | Seki | F16J 15/061 277/630 |
| 2009/0026717 | A1 * | 1/2009 | Tsuji | F16K 51/02 277/650 |
| 2011/0169229 | A1 * | 7/2011 | Hamade | F16J 15/104 277/650 |
| 2012/0313027 | A1 * | 12/2012 | Welchner | F16J 15/024 251/318 |

* cited by examiner

Primary Examiner — Gilbert Y Lee
(74) Attorney, Agent, or Firm — Gable Gotwals

(57) ABSTRACT

A slip seal having a double profile provides two barriers to withstand the working pressure of a medium acting against the slip when a plug valve is in the closed position.

13 Claims, 2 Drawing Sheets

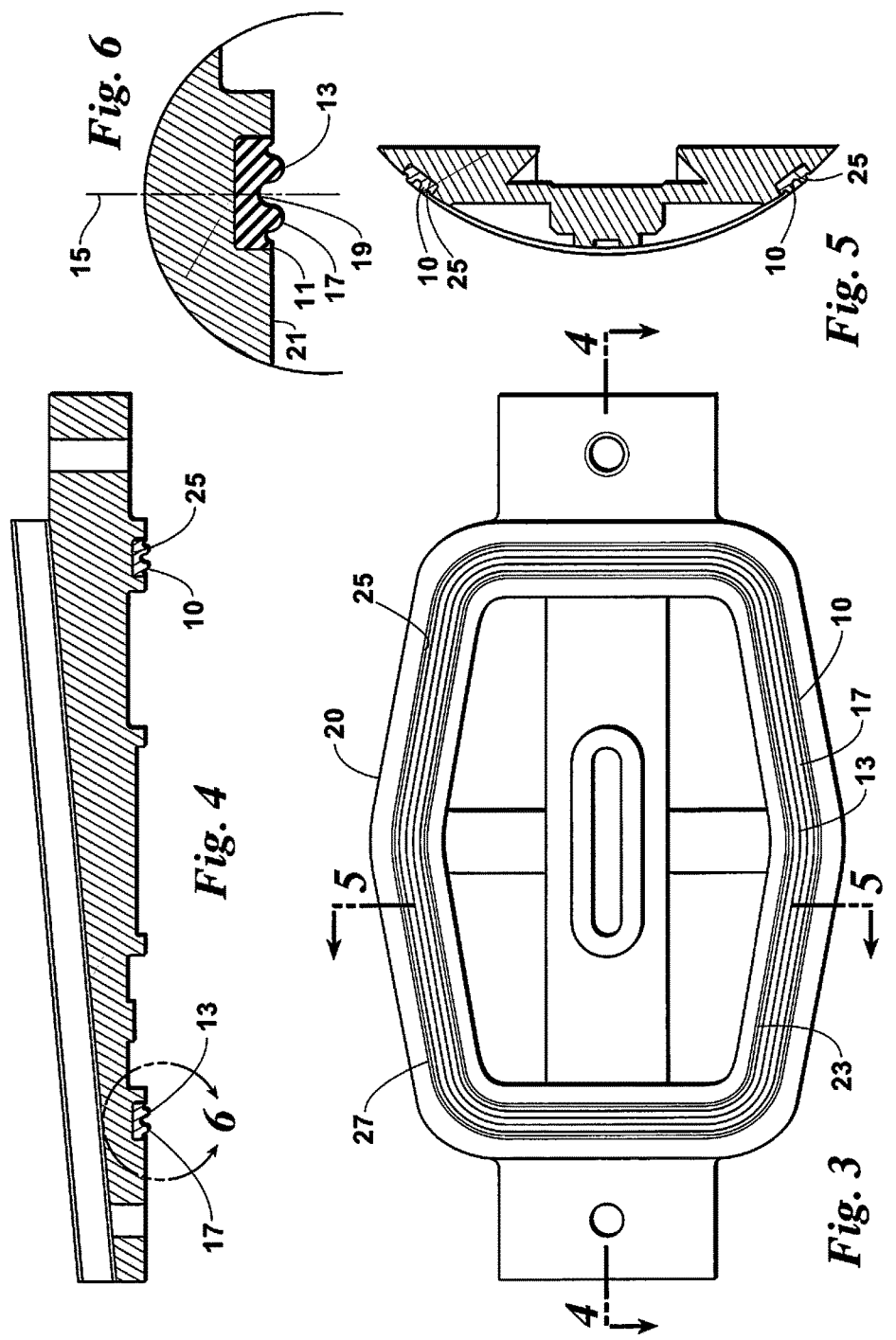

DOUBLE SLIP SEAL PROFILE FOR PLUG VALVES

BACKGROUND

This invention is in the field of slip seals used in plug valves found in oil and gas applications.

A plug valve has two slips which are pressed against the inside diameter bore of the valve body by the downward motion of the wedge-shaped plug during valve closing (see FIG. 1). This downward motion causes the slip seals bonded to the slips to move outward toward the valve body, thereby producing a seal that holds the pressure of the medium flowing into and through the valve body.

Prior art slip seal profiles have a single point of contact between the slip seal and the valve body (see e.g. FIG. 2). This single point of contact is flat, located in the center of the seal profile, runs the entire length of the slip seal, and provides a relatively wide contact area. Sometimes this contact area does not provide enough resistance to the working pressure of the medium and the slip seal leaks.

SUMMARY

A preferred embodiment of a slip seal provides two points of contact or surface areas between the slip seal and the valve body. This double seal profile provides two barriers to withstand the working pressure of the medium acting against the slip when the plug valve is in the closed position.

Each of the two points of contact is preferably rounded and run the entire length of the seal seat. The first point of contact is located toward an inside peripheral edge of the slip seal seat. The second point of contact is located toward the outside peripheral edge of the slip seal seat and acts as a back-up seal to the first.

BRIEF DESCRIPTION OF THE DRAWINGS

FIG. 3 is a view of a preferred embodiment of a double seal profile slip seal when bonded to a slip of a plug valve.

FIG. 4 is a cross-section view of the slip and slip seal taken along section line 4-4 of FIG. 3.

FIG. 5 is a cross-section view of the slip and slip seal taken along section line 5-5 of FIG. 3.

FIG. 6 is an enlarged profile view of the seal taken along section 6 of FIG. 3.

ELEMENTS AND NUMBERING USED IN THE DRAWINGS AND DETAILED DESCRIPTION

Figures 1, 2:
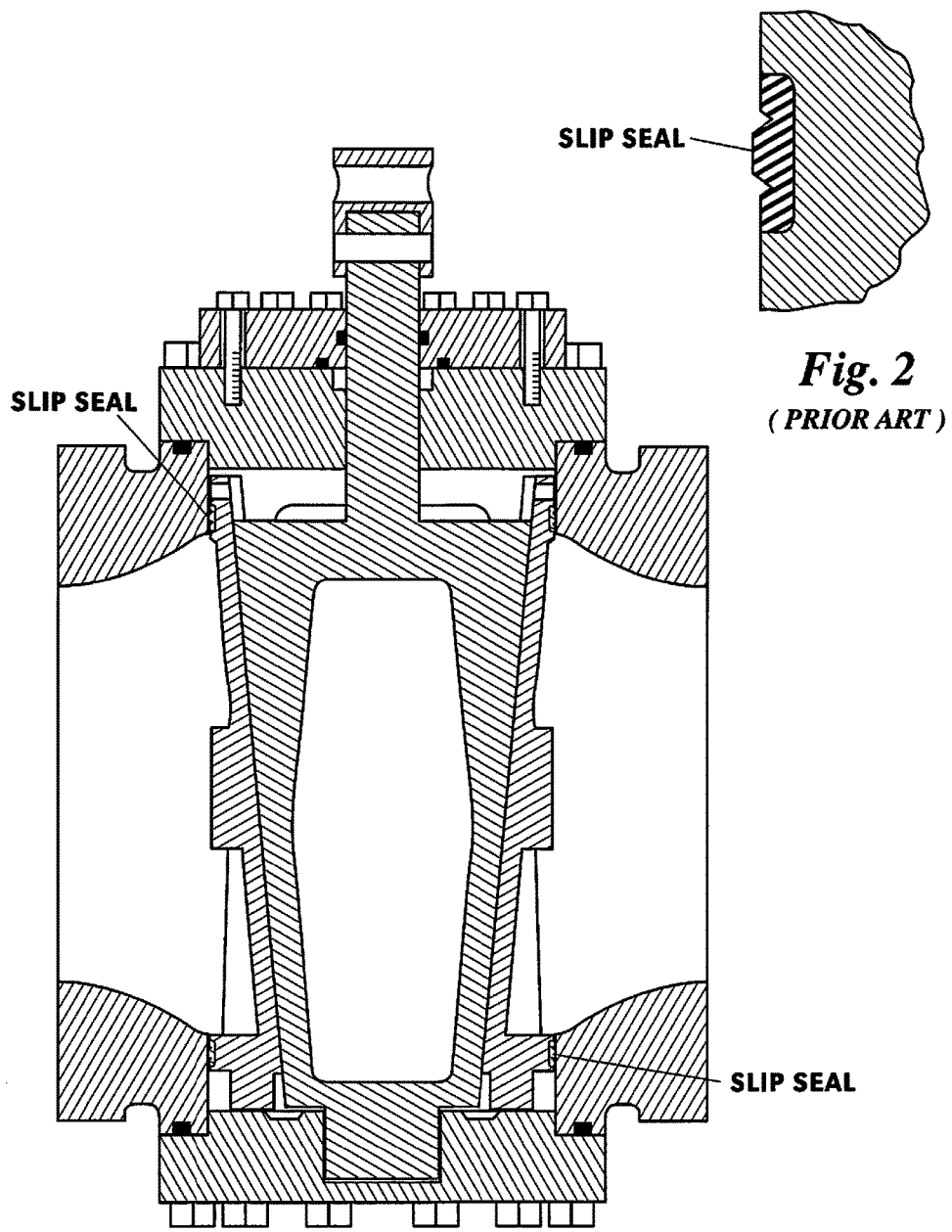
FIG. 1 is a cross-section view of a prior art plug valve.
FIG. 2 is a profile view of a prior art slip seal used in the plug valve of FIG. 1.

10 Slip seal
11 Face surface
13 First contact point or area
15 Vertical centerline
17 Second contact point or area
19 Recessed (valley) portions of face surface
20 Slip
21 Slip face
23 Inner peripheral edge of slip seal seat
25 Slip seal seat
27 Outer peripheral edge of slip seal seat

DETAILED DESCRIPTION OF THE PREFERRED EMBODIMENTS

A preferred embodiment of a double profile slip seal 10 for use in a slip 20 of a plug valve is shown in FIGS. 3-6. The slip seal's double profile provides two barriers to withstand the working pressure of the medium acting against the slip when the plug valve is in the closed position.

The slip seal 10 has a first and a second contact point or area 13, 17 spaced apart from one another on opposite sides of the seal's centerline 15. The contact areas 13, 17 protrude outwardly from the slip seal seat 25 and, when seated in the seat 25 in a non-sealing position, protrude above the slip face 21. Preferably, the contact areas 13, 17 are rounded in shape, giving a sinusoidal wave shape to the seal face 11, with portions 19 of the face 11 lying below the slip face 21.

First contact area 13 is located toward the inside peripheral edge 23 of the slip seal seat 25. This first contact area 13 provides the primary seal. The second contact area 17 is located toward the outside peripheral edge 27 of the slip seal 25. This second area of contact 17 acts as a back-up seal to the first contact area 13.

When in an assembled state, the double profile slip seal 10 is bonded to the seat 25 of the slip. Downward motion of a wedge plug body like that shown in FIG. 1 causes the slips 20 to move outward toward the valve body, thereby producing a double barrier seal that holds the pressure of the medium flowing into and through the valve body.

What is claimed:

1. A seal adapted for use in a slip of a plug valve body, the seal comprising:
   a face surface, a slip side opposite said face surface, an inside edge surface and an outside edge surface;
   a flat surface extending an entire width and length of the seal on said slip-side of the seal;
   a first and a second outwardly protruding contact surface area on said face surface of the seal and arranged normal to the flat surface on the slip seal side, said contact surface areas being spaced apart from one another by a recessed valley surface and from said inside edge surface and said outside edge surface of the seal by additional respective recessed valley surfaces;
   wherein said inside edge surface defines a first distance from said face surface to said slip side of said seal;
   wherein said outside edge surface defines a second distance from said face surface to said slip side of said seal; and
   wherein said recessed valley surface defines a third distance from a closest point of said recessed valley surface to said flat surface;
   wherein said first distance equals said second distance;
   wherein said third distance is less than said first distance and said second distance.

2. A seal according to claim 1 wherein the first and second contact surface areas are a rounded contact surface area.

3. A seal according to claim 1 wherein said contact surface areas protrude above an upper face of the slip when the seal is in a non-sealing position.

4. A seal according to claim 1 further comprising the seal bonded to the slip.

5. A method of sealing a plug valve, the plug valve body including a pair of slips each equipped with a slip seal seat containing a slip seal, the method comprising:
   forming a first and a second seal to withstand working pressure of a medium acting against a respective slip when the plug valve is in a closed position, the first and second seal formed, respectively, by a first and a second outwardly protruding contact surface area spaced apart from one another on a valve body side of the slip seal and arranged normal to a flat surface on a slip side of the slip seal, said first contact surface area spaced apart from a first side edge of the slip seal by a first recessed valley surface and said second contact surface area spaced apart from a second side edge of the slip seal by a second respective recessed valley surface;

wherein said first side edge having a first length, wherein said second side edge having a second length; and wherein said first recessed valley surface defines a third distance from a closest point of said first recessed valley surface to said flat surface;

wherein said second recessed valley surface defines a fourth distance from a closest point of said second recessed valley surface to said flat surface;

wherein said first length equals said second length;

wherein said third distance and said fourth distance are less than said first length and said second length.

6. A method according to claim 5 wherein the first and second contact surface areas are a rounded contact surface area.

7. A method according to claim 6 wherein the first and second contact surface areas form a portion of a sinusoidal-shaped seal face.

8. A method according to claim 5 wherein said contact surface areas protrude above an upper face of a respective slip when the plug valve is in an open position.

9. A seal adapted for use in a slip of a plug valve body, the seal comprising:

a flat slip-side side of the seal;

a double seal profile on a valve body side of the seal;

the double seal profile including two outwardly protruding contact areas arranged normal to the flat slip-side and spaced apart from one another by a recessed valley and from a respective first side edge and second side edge of the seal;

wherein said first side edge defines a first length;

wherein said second side edge defines a second length;

wherein said recessed valley defines a third distance from a closest point of said recessed valley to said flat slip-side side;

wherein said first length equals said second length; and wherein said third distance is less than said first length and said second length.

10. A seal according to claim 9 further comprising the two outwardly protruding contact areas each being a rounded contact area.

11. A seal according to claim 9 further comprising the recessed valley portion being arcuate-shaped.

12. A seal according to claim 9 further comprising the seal bonded to the slip-side side of the seal.

13. A plug valve slip assembly comprising:

a slip body having an inside plug engaging side and an outside valve body engaging side;

a slip face on said outside valve body engaging side of said slip body;

an annular slip seal seat defined by said slip face;

said annular slip seal seat defining an inside edge and an outside edge;

a slip seal received in said slip seal seat, said slip seal defining a face surface, said slip seal defining a flat surface on a slip seal side, said slip seal further defining an inside edge and an outside edge;

a first outwardly protruding contact surface area and a second outwardly protruding contact surface area on said face surface of said slip seal and arranged normal to the flat surface on the slip seal side, said first outwardly protruding contact surface area spaced apart from said second outwardly protruding contact surface area by a central recessed valley;

said first outwardly protruding contact surface area spaced apart from said inside edge by a first recessed valley;

said second outwardly protruding contact surface area spaced apart from said outside edge by a second recessed valley;

wherein said inside edge defining a first length from said flat surface to said face surface;

wherein said outside edge defines a second length from said flat surface to said face surface;

wherein said central recessed valley defines a third distance from a closest point of said central recessed valley to said flat surface;

wherein said first length and said second length are the same;

wherein said third distance is less than said first length and said second length.

* * * * *